Figure 7:
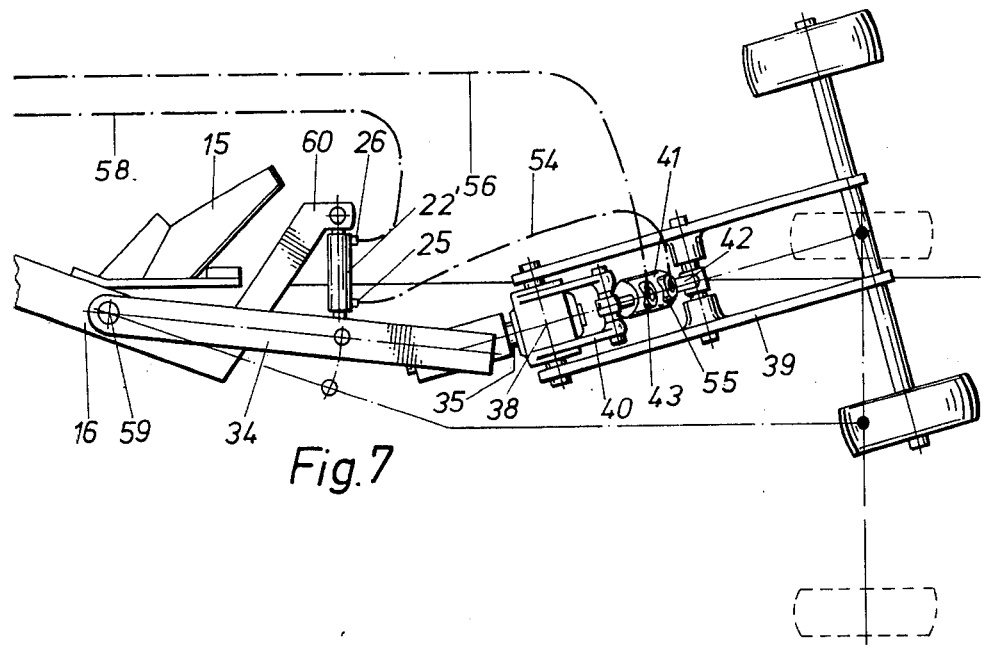

United States Patent [19]

Becker

[11] 3,934,653
[45] Jan. 27, 1976

[54] SEMI-MOUNTED TWO-WAY PLOW
[75] Inventor: Ignaz Albert Josef Becker, Preussisch Oldendorf, Germany
[73] Assignee: Rabewerk Heinrich Clausing, Bad Essen-Linne, Germany
[22] Filed: Feb. 25, 1974
[21] Appl. No.: 445,138

[30] Foreign Application Priority Data
Mar. 2, 1973 Germany............................ 2310497

[52] U.S. Cl. ................. 172/212; 172/206; 172/224
[51] Int. Cl.² ......................... A01B 3/34; A01B 3/32
[58] Field of Search..... 172/204, 206, 212, 224–227

[56] References Cited
UNITED STATES PATENTS

| | | | |
|---|---|---|---|
| 3,517,750 | 6/1970 | Bell..................................... | 172/226 |
| 3,605,904 | 9/1971 | Rutterford ......................... | 172/212 |
| 3,627,058 | 12/1971 | Johannsen ......................... | 172/206 |
| 3,749,178 | 7/1973 | Watts.................................. | 172/225 |

FOREIGN PATENTS OR APPLICATIONS

| | | | |
|---|---|---|---|
| 1,268,430 | 6/1961 | France............................... | 172/224 |
| 1,313,077 | 11/1962 | France............................... | 172/224 |
| 1,242,032 | 6/1967 | Germany........................... | 172/226 |
| 1,276,958 | 9/1968 | Germany........................... | 172/225 |
| 950,912 | 2/1964 | United Kingdom................ | 172/204 |
| 246,435 | 1/1947 | Switzerland....................... | 172/224 |

Primary Examiner—Edgar S. Burr
Assistant Examiner—Paul T. Sewell
Attorney, Agent, or Firm—Woodhams, Blanchard and Flynn

[57] ABSTRACT

A semi-mounted or trailing roll-over plow arranged for maximum control over the plowing components. In such a plow wherein the axis of rotation of the roll-over (rotatable) slow part does not go through the center of gravity of such rotatable plow part, there is provided mechanism by which the rotatable plow part is shifted, and thereby its center of gravity is moved from an operating position substantially in a horizontal direction toward the axis of rotation, for thereby minimizing eccentricity of the rotatable plow part during a subsequent roll-over, or rotation. Hydraulic means are provided for effecting the lifting and/or shifting of the plow components as required for various phases of operation thereof.

19 Claims, 8 Drawing Figures

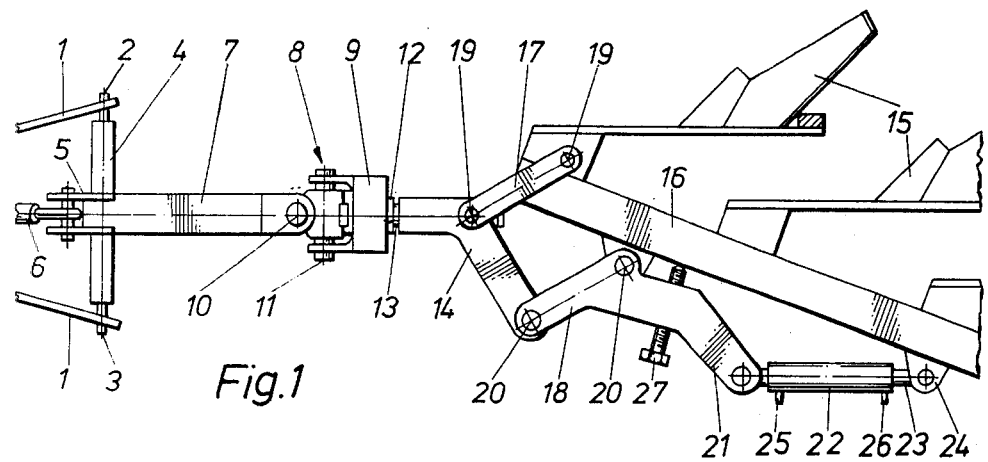
Fig.1
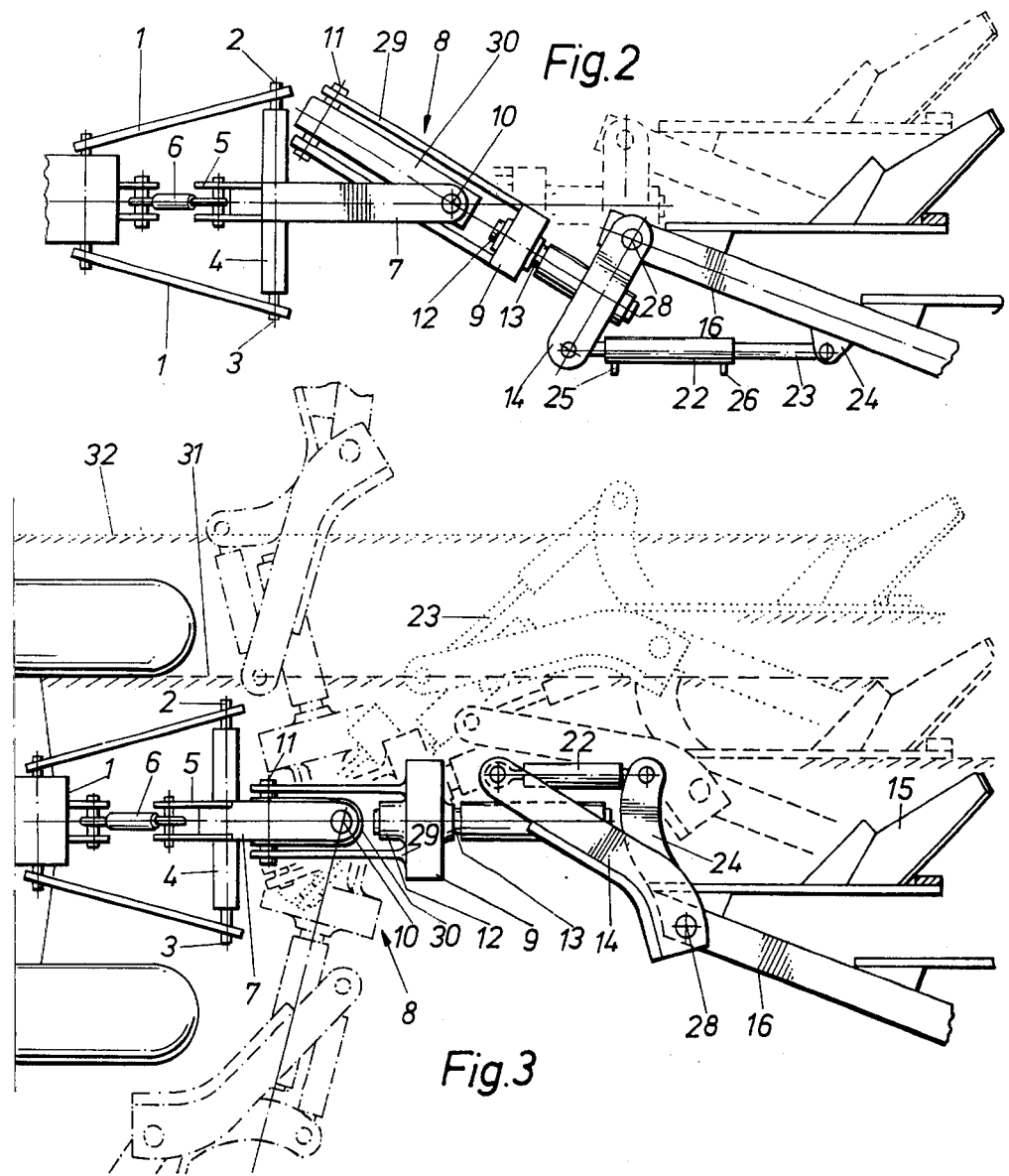
Fig.2
Fig.3

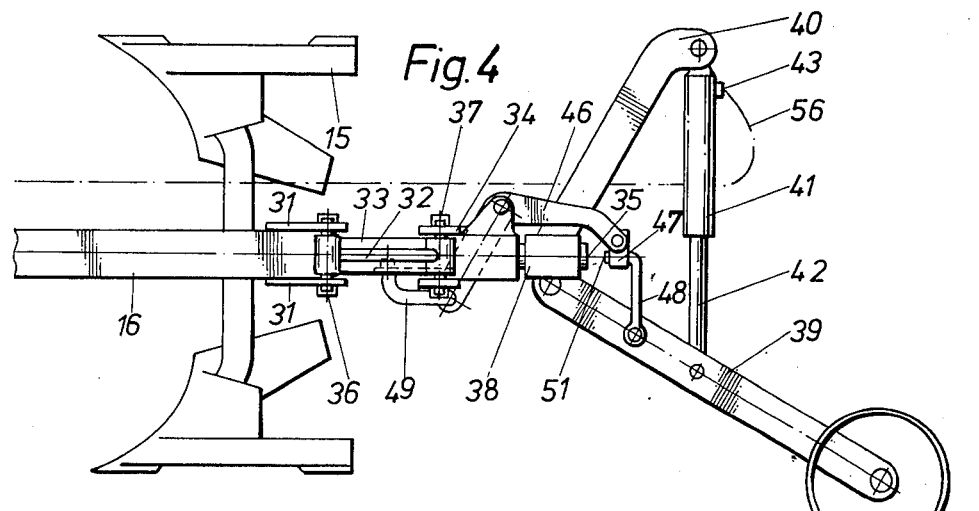
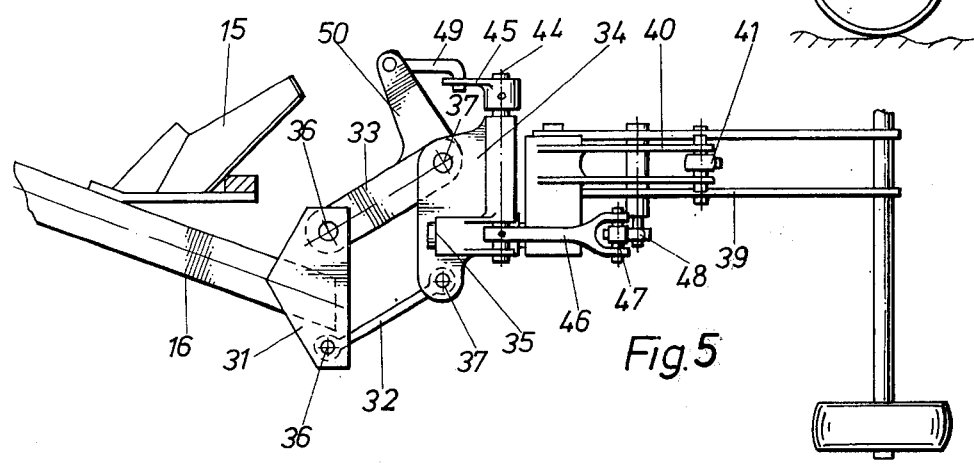
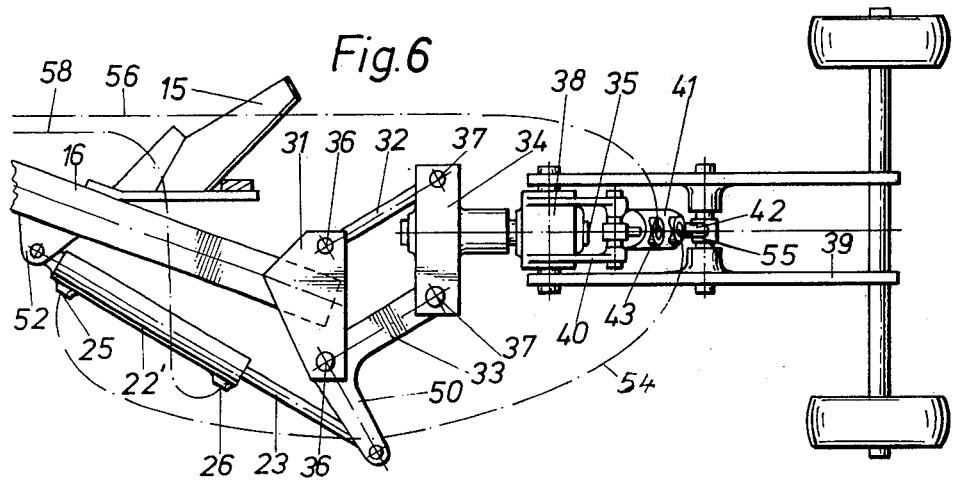

U.S. Patent   Jan. 27, 1976   Sheet 3 of 3   3,934,653

SEMI-MOUNTED TWO-WAY PLOW

The invention relates to a semi-mounted or trailing rollover plow, in which in the operating position the axis of rotation does not go through the center of gravity of the rotatable portion of the plow.

Semi-mounted roll-over plows of the mentioned type have in general two rotary bearings which support shafts connected to the ends of the rotatable portion of the plow. The front rotary bearing is carried by a bearing support which is connected to the draw bar of the plow and the rear rotary bearing is carried by an axle support of the rear wheel carriage or by a rear transport wheel held by a stabilizer. In such plows the center of gravity is for structural reasons spaced relatively far from the imaginary axis of rotation (i.e. an imaginary line connecting the front and rear bearing systems of the rotatable portion of the plow), so that in the first half of rotation the center of gravity is lifted substantially and in the second half of rotation same drops again accordingly. Thus during the first half of rotation a relatively large amount of work must be carried out, while in the second half of rotation the energy which becomes free due to the lowering of the center of gravity must be dissipated by suitable means. In order to reduce the work which must be carried out in the first half of rotation and in order to reduce the energy which must be dissipated in the second half of rotation, it has been suggested to lower the plow end in the first half of rotation and to lift same again in the second half of rotation. Since the center of gravity lies approximately in the center of the plow, the plow end must be lowered approximately at twice the amount at which the center of gravity is lowered. In the case of longer plows, the work which must be carried out still in spite of the lowering and the energy which must be dissipated remain considerable because the ground clearance of the plow and thus the path available for lowering the plow is limited.

The basic purpose of the invention is to construct a semimounted or trailing roll-over plow of the type mentioned above in such a manner that the center of gravity even during rotation of a longer plow need not be lifted or need only be lifted slightly.

This purpose is attained according to the invention by causing the rotatable portion of the plow to be movable relative to the front and/or rear bearing point which carries said rotatable portion in a horizontal direction toward the imaginary axis of rotation. If the center of gravity is shifted far enough to lie in the imaginary axis of rotation, then during one rotation of the plow neither a lifting nor a lowering of the center of gravity takes place.

To shift the rotatable plow part in the horizontal direction, either a hydraulic cylinder or a mechanical gearing (e.g. mechanical linkage) is used. When the mechanical gearing is used, the vertical movement is transformed, during lifting of the rear plow end through a lever system which engages the axle support of the rear wheel carriage, into a horizontal movement which shifts the rotatable plow part, or is transformed into a relative movement of parts of the three-point linkage. If a hydraulic cylinder is used for the movement of the rotatable plow part in the horizontal direction, then the inlet opening of the cylinder for the swinging of the front and/or the rear end of the rotatable portion of the plow is advantageously connected to the feed line for the lift cylinder of the transport wheel or the carriage or the outlet opening of this lift cylinder for lifting the rear end of the plow. Either a hydraulic storage means or a hydraulic line leading to the tractor can be connected to the outlet opening of the shift cylinder. If a single acting shift cylinder is used, then a spring is used for returning the shift cylinder into its initial position.

In one embodiment of the invention, the end or the ends of the rotatable plow part are pivotal about a vertical axis which is held by a base frame which is connected to the axis of rotation of the plow. In a preferred embodiment of the invention the end of the rotatable plow part is connected through two linkage members to the base frame which is rigidly connected to the axis of rotation of the plow. The use of two linkage members which form a four-bar linkage has the advantage that the rotatable plow part can be shifted without the rear wheel carriage being deflected from the direction of travel. When the rotatable plow part is hinged only to one pin, the rear wheel carriage is deflected from the direction of travel. In order to keep this deflection as small as possible, it is advantageous to construct the wheels of the rear wheel carriage as trailing wheels. After a rotation of the plow into a half-rotated position, the rear wheel carriage again swings into the direction of travel because the formerly lateral shift is now again vertical, so that the transport of the plow is not affected by the shifting of the rotatable plow part.

Several exemplary embodiments of the invention are described more in detail hereinafter in connection with the drawings, in which:

FIG. 1 is a top view of a parallel shift of the rotatable part of a semi-mounted roll-over plow according to the invention at the front end thereof, FIG. 2 is a top view of the front end of a further exemplary embodiment of a semi-mounted roll-over plow of the invention, FIG. 3 illustrates an embodiment similar to FIG. 2, however, with a specially large field of traverse so that the tractor can travel during plowing in or beside the previous furrow, FIG. 4 is a side view of the rear end of a semi-mounted roll-over plow of the invention, in which the parallel shift is effected by means of a mechanical gearing, FIG. 5 is a top view of the exemplary embodiment illustrated in FIG. 4.

Figure 8:
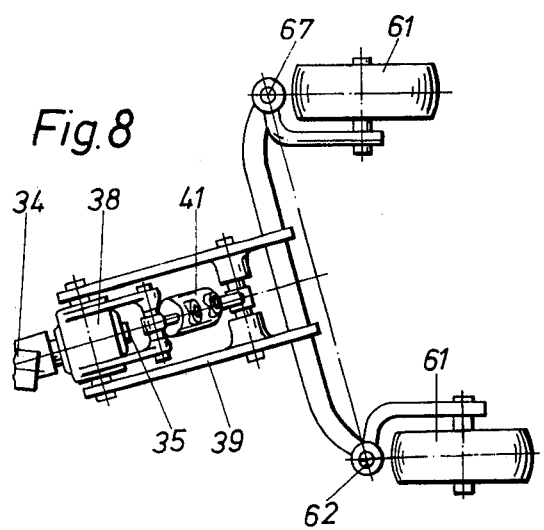

FIG. 6 is a top view of the rear plow end of an exemplary embodiment of the invention having a movable hydraulic means, FIG. 7 is a top view of the rear plow end of a further exemplary embodiment of the invention, and FIG. 8 illustrates a rear wheel carriage for a plow embodying the invention, the wheels of which are constructed as trailing wheels.

In FIG. 1, which illustrates the operating position of the plow, the lower linkage members 1 are secured through pins 2, 3 on a hitch member 4. In the center of the hitch member 4 there is mounted an upstanding frame element 5 at the upper end of which the upper linkage member 6 of the tractor engages. A rearwardly extending draw bar 7 is secured on the hitch member 4, which draw bar is connected to a bearing mount 9 through a universal joint 8. The universal joint 8 has a vertical axis 10 and a horizontal axis 11.

A rotary bearing 12 for a rotatable stub shaft 13 is arranged in the bearing mount 9, which rotatable stub shaft is connected to a frame base 14. The frame 16 which carries the plow members 15 is hinged through two linkage members 17, 18 to the base frame 14 which is connected to the axis of rotation 13. The linkage members 17, 18 are pivotal about axes 19, 20 which are hinged to the base frame 14 and the plow frame 16. An arm 21 is formed onto the linkage member 18 and the end of such arm is engaged by a shift cylinder 22. The piston 23 of the shift cylinder 22 is hinged to a fork 24 which is secured on the frame 16. The inlet or outlet opening of the shift cylinder 22 are identified by reference numerals 25, 26. An adjustable screw 27 is mounted on the arm 21 to adjust cutting width of the first plow member.

The inlet opening 25 of the pressure cylinder 22 is connected through a not-illustrated hydraulic line either to the inlet or outlet opening of a lift cylinder for lifting the rear plow end. The outlet opening 26 of the shift cylinder 22 can either be connected to a hydraulic storage or can be connected to the tractor. It is also possible to use a one-way acting cylinder with a return spring. If pressure oil is fed into the shift cylinder 22 through the inlet opening 25, then the plow frame 16 pivots (rotates) with its plow members 15 about the axes 19, 20 which causes the center of gravity of the plow to be shifted toward the imaginary axis of rotation. The joints 19, 20 do not need to form a parallelogram. The extensions of the linkage members 17, 18 intersect advantageously at a rearwardly spaced point.

In FIG. 2, the functionally corresponding parts are identified by the same reference numerals. The full lines show the plow in a position which is swung in the horizontal direction, however, which is not yet rotated, while the dashed lines show the plow in the operating position. Aside from the special construction of the universal joint 8 this plow differs from the one of FIG. 1 in that the plow frame 16 is hinged directly through a pin 28 to the frame base 14 which is connected to the axis of rotation 13. The frame base 14 is in turn again fixedly connected to the stub shaft 13. The shift cylinder 22 engages the other end of the frame base 14, the piston 23 of which shift cylinder engages the plow frame 16 through a fork 24.

The horizontal axis means 11 of the universal joint 8 is carried by a long fork 29 which is fixedly connected to the bearing support 9. An intermediate part 30 is connected at its one end to the draw bar 7 through the vertical axis 10 and is connected at its other end pivotally to the horizontal axis means 11. This construction of the universal joint has the advantage that the horizontal axis means 11, through which passes the pull line of the plow, lies very close to the hinge points of the lower linkage members. One thus obtains a small lever arm for the load acting on the tractor so as to minimize the danger of tilting up of the tractor.

In FIG. 3, the functionally corresponding parts are identified by the same reference numerals. The plow illustrated in FIG. 3 differs from the one illustrated in FIG. 2 only in that the swing axis 10 is arranged closer to the draw bar of the plow and the axis 28 is arranged farther back. Further, the hinge points of the shift cylinder 22 lie on the frame base 14 and of the fork 24 near the central plane of the tractor. The axis 28 is spaced from the swing axis 10 sufficiently that it is positioned adjacent the rear tire of the tractor when the tractor is swung 90° to the plow, as illustrated in dash-dotted lines in FIG. 3. In this manner, the turning of the plow is facilitated such that the tractor can travel also beside the previous furrow 32 which is desired in the case of multishare plows. The position of the plow in FIG. 3 which is shown by dots illustrates the position of the plow in which the tractor runs alongside of the previous furrow, thus on the unplowed ground. The degree of the furrow-side swing of the plow is adjusted by means of an adjustable stop 27, as same is illustrated in FIG. 1. The dotted lines in FIG. 3 illustrate the plow in the normal position in which the tractor runs in the furrow 31.

Especially when the tractor travels alongside the previous furrow, the first plow member, and thus all of the remaining ones, must be moved laterally much farther on the furrow side so that the eccentric distance of the center of gravity of the pivoted plow unit is very far from the axis of pivoting and a very large pivot cylinder would have to be used for effecting the desired pivoting of the plow. The parallel shift of the plow in the horizontal plane makes it possible to shift same with the same small shift cylinder as needed for a plow with which the tractor travels beside the first furrow.

The width adjustment of the first plow member or the adjustment of the swinging out of the plow in operating position takes place here just as in FIG. 2 by an adjustable stop, not shown, which is, however, generally similar to the stop 27 illustrated in FIG. 1.

FIG. 3 also illustrates, in dash-dotted lines, two swungout positions of the lifted, but less than half-rotated plow, which positions show that the tractor can be swung more than 90° relative to the plow. In the present case this is 105°. Neither the one nor the other side of the plow hits the rear wheels of the tractor. The half-rotated plow can be swung yet farther, here approximately 120° to both sides.

FIGS. 4 and 5 show the rear end of the frame 16 with its plow member 15 in the transporting position. Plates 31 are welded on the end of the frame 16, between which plates linkage members 32, 33 are pivoted. The other ends of the linkage members are pivoted to a base member 34 which carries the rear stub shaft 35. The linkage members 32, 33 are pivotal about axes 36, 37.

The stub shaft 35 of the plow is supported in a rotary bearing 38 on which is hinged an axle support 39 of a rear wheel carriage. Further, an arm 40 is secured on the rotary bearing 38, at the end of which arm a lift cylinder 41 is hinged for lifting the rear end of the plow. The piston rod 42 of the lift cylinder 41 is pivoted to the axle support 39. A pressure oil line 56 is connected to the inlet opening 43 of the lift cylinder 41, which pressure oil line leads to the tractor.

A further horizontal shaft 44 is supported on the base member 34 perpendicularly to the rotary axis 35 of the plow, to the two ends of which shaft 44 one crank arm 45, 46 each is keyed. The crank arm 46 is connected through a universal joint 47 to a linkage member 48 which is rotatably supported on the axle support 39. One end of a linkage member 49 pivotally engages the crank arm 45 and the other end of the linkage member 49 is pivotally connected to a shoulder 50 formed onto the linkage member 33. The one axis 51 of the universal joint 47 is arranged in the transporting position in alignment with the stub shaft 35 of the plow. During a lowering of the rear end of the plow, which lowering is effected by the lift cylinder 41, the vertical movement of the rotary bearing 38 is transferred through the mechanical gearing 48, 46, 44, 45, 49 and 50 onto the plow frame 16 in such a manner that same carries out a horizontal swinging movement.

FIG. 6 illustrates an exemplary embodiment in which the swinging movement of the pivotal part of the plow frame in the horizontal plane is effected by a hydraulic cylinder 22'. The same parts are again identified by the same reference numerals. The shift cylinder 22 is secured on a fork 52 which is formed onto the frame 16. The piston rod 23 of the cylinder 22' engages the arm 50 of the linkage member 33. The inlet opening 25 of the cylinder 22' is connected through a hydraulic line 54 to the outlet opening 55 of the lift cylinder 41. A hydraulic line 56 is connected at the inlet opening 43 of the cylinder 41, which line leads to the tractor. A hydraulic line 58 is connected to the outlet opening 26 of the shift cylinder 22', which line 58 leads either to the tractor or to a pressure storage means. If pressure oil is fed to the cylinder 41 through the line 56, then the pressure oil which is displaced in the cylinder 41 flows through the outlet opening 55, the pressure line 54 into the shift cylinder 22' through which the swinging of the shiftable plow part in the horizontal plane is started. By connecting the cylinders 41 and 22' in series, the swinging of the shiftable plow part in the horizontal direction is concluded when the rear end of the plow is lifted out. The two cylinders can, however, also be connected in parallel.

In the exemplary embodiment which is illustrated in FIG. 7, the same parts are identified by the same reference numerals. The embodiment according to FIG. 7 differs from the one of FIG. 6 in that the frame 16 is secured directly through only one vertical swivel axis 59 onto a base frame 34 which comprises a carrier. The base frame 34 is in turn again fixedly connected to the rotational axis 35. The shift cylinder 22', the control of which is the same as in FIG. 6, is secured at one end on a bent part 60 of the plow frame 16 and engages with its other end the base frame 34. The plow end which is illustrated in dashed lines in FIG. 7 represents its position during plowing. At the lifted plow which is swung in the horizontal plane, the rear wheel carriage is positioned sloped to the direction of travel of the plow because for the swinging of the rotatable part of the plow in the horizontal plane only one vertical axis 59 is available. If the plow is rotated halfway so that the two alternately useable plow members 15 lie horizontally side-by-side, then the plow assumes a symmetric position. By positioning the rear wheel carriage in the sloped manner shown in solid lines, when the plow is lifted but not rotated, the rear wheel carriage would, if the plow would be transported in this position, travel at a laterally wide shifting with respect to the tractor. By using trailing wheels in place of rigidly secured wheels, this lateral shifting can be reduced. Thus FIG. 8 shows a plow rear frame according to the invention in which the plow carriage is provided with trailing wheels 61 which can pivot about vertical axes 62.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. Semi-mounted or trailing roll-over plow, comprising:
    a rotatable plow part including an elongate frame member, said rotatable plow part further including first and second sets of plow members fixedly mounted upon said elongate frame member and alternately selectable for plowing by rotation of said elongate frame member to corresponding first and second operating positions, said first and second plow member sets being vertically stacked and horizontally offset from the same side of said elongated frame member in said first and second operating positions, the center of gravity of said rotatable plow part being horizontally offset from said axis of rotation and elongate frame member in both said operating positions due to said horizontal offset of said plow member sets on the same side of said elongate frame member;
    means carrying said elongate frame member and having front and rear bearing means for supporting said elongate frame member for rotation about an axis of rotation and longitudinally therebetween;
    locating means supportingly interposed between at least one of said front and rear bearings and the adjacent end of said elongate frame member and horizontally shiftably locating said rotatable elongate frame member with respect to said one of said front and rear bearing means for permitting a shift of the center of gravity of said rotatable plow part substantially to said axis of rotation;
    shift means interengaging the locating means with one of said frame member and carrying means adjacent said one bearing means and actuable preparatory to rotation for horizontally shifting said center of gravity of said rotatable plow part substantially to said axis of rotation by sufficient horizontal shifting of the adjacent end of said elongate frame member out of operating position, thereby substantially reducing the vertical lifting and retarding forces required to rotate the rotatable plow part between operating positions.

2. Plow according to claim 1, in which said shift means are connected cooperatively with said locating means and the adjacent end of said elongate frame member and are actuable prior to rotation for horizontally shifting said center of gravity toward said axis of rotation from an initial horizontal offset position and actuable after rotation for returning said center of gravity to said initial horizontal offset position, said shift means thus substantially horizontally moving said rotatable plow part.

3. Plow according to claim 2 in which said shift means comprises a hydraulic shift cylinder and means interconnecting same between said elongate frame member adjacent said one bearing and said locating means for carrying out said shifting of said rotatable plow part and center of gravity.

4. Semi-mounted or trailing roll-over plow, comprising:
    a rotatable plow part;
    means carrying said rotatable plow part and having front and rear bearing means for supporting said rotatable plow part for rotation about an axis of rotation;
    said rotatable plow part including first and second plow members alternately selectable for use by rotation of said rotatable plow part to a corresponding operating position, said rotatable plow part having a center of gravity offset from said axis of rotation in said operating position;
    means movably locating said rotatable plow part with respect to at least one of said front and rear bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members;

means cooperative with said locating means and actuable prior to rotation for accomplishing said shifting of said center of gravity toward said axis of rotation from an initial position and actuable after rotation for returning said center of gravity to said initial position, said actuable means thus substantially horizontally moving said rotatable plow part, said actuable means comprising a hydraulic shift cylinder and means interconnecting same with said rotatable plow part and locating means for carrying out said moving of said rotatable plow part and center of gravity;

said carrying means including a double acting lift cylinder actuable for lifting one said bearing means and thereby the corresponding end of said rotatable plow part from said operating position to a lifted position, said lift cylinder having an outlet for discharging of pressure fluid during such lifting, said shift cylinder having an inlet connected to said outlet of said lift cylinder, whereby said shifting of said center of gravity horizontally toward said axis of rotation is accomplished substantially during lifting of the ground engaging set of plow members from said operating position to said lifted position, as in preparation for a rotation of said rotatable plow part.

5. Semi-mounted or trailing roll-over plow, comprising:

a rotatable plow part;

means carrying said rotatable plow part and having front and rear bearing means for supporting said rotatable plow part for rotation about an axis of rotation;

said rotatable plow part including first and second plow members alternately selectable for use by rotation of said rotatable plow part to a corresponding operating position, said rotatable plow part having a center of gravity offset from said axis of rotation in said operating position;

means movably locating said rotatable plow part with respect to at least one of said front and rear bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members;

means cooperative with said locating means and actuable prior to rotation for accomplishing said shifting of said center of gravity toward said axis of rotation from an initial position and actuable after rotation for returning said center of gravity to said initial position, said actuable means thus substantially horizontally moving said rotatable plow part, said actuable means comprising a hydraulic shift cylinder and means interconnecting same with said rotatable plow part and locating means for carrying out said moving of said rotatable plow part and center of gravity;

a single acting lift cylinder on said carrying means and means connecting said lift cylinder to adjacent one of said bearing means for lifting the adjacent end of said rotatable plow part, and a pressure fluid feed line connected to the inlet of said lift cylinder and the inlet side of said shift cylinder, whereby to substantially simultaneously lift said rotatable plow part and carry out said shifting of said center of gravity thereof horizontally toward said axis of rotation, as prepatory to a rotation of said rotatable plow part.

6. Semi-mounted or trailing roll-over plow, comprising:

a rotatable plow part;

means carrying said rotatable plow part and having front and rear bearing means for supporting said rotatable plow part for rotation about an axis of rotation;

said rotatable plow part including first and second plow members alternately selectable for use by rotation of said rotatable plow part to a corresponding operating position, said rotatable plow part having a center of gravity offset from said axis of rotation in said operating position;

means movably locating said rotatable plow part with respect to at least one of said front and rear bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members;

said carrying means including lifting means engageable with one of said bearing means and actuable for lifting of said rotatable plow part from said operating position, wherein a selected set of plow members is engageable with the ground for plowing, to a lifted position;

means adjacent at least one of said bearing means and actuable for carrying out said horizontal shifting of said rotatable plow part toward said axis of rotation, and means interconnecting said lifting means and actuable means for causing said shifting of said rotatable plow part in said horizontal direction substantially simultaneously with said lifting of said plow part.

7. Plow according to claim 6 in which said lifting means comprises a double acting lift pressure fluid cylinder and means securing same on said carrying means adjacent to rear end of said rotatable plow part for lifting the latter, said actuable means comprises a shift pressure fluid cylinder connected to one end of said rotatable plow part, said shift cylinder being double acting and having an inlet opening and an outlet opening for respectively receiving and exhausting pressure fluid to accomplish said shifting of said rotatable plow part in said horizontal direction toward said axis of rotation, said lift cylinder being double acting and having an outlet opening for exhausting pressure fluid during said lifting, said shift cylinder inlet being connected to said lift cylinder outlet, and including a pressure fluid supply-return line from said shift cylinder outlet.

8. Plow according to claim 6 in which the lifting means comprises a single acting lift pressure fluid cylinder, said carrying means include a rear wheel carriage supporting said rear bearing means above the ground, means operatively interconnecting said lift cylinder between said rear wheel carriage and rear bearing means for lifting the rear end of said rotatable plow part upon actuation of said lift cylinder, said actuable means including a shift pressure fluid cylinder connected to said rotatable plow part and having an inlet, and including a pressure fluid feed line connected to the shift cylinder inlet and the sole inlet of said single acting lift cylinder for simultaneously lifting and horizontally shifting said rotatable plow part in said horizontal direction toward said axis of rotation.

9. Plow according to claim 6 including mechanical linkage means interconnecting a part of said carrying means, adjacent one end of said rotatable plow part, with the adjacent locating means of said rotatable plow part, and responsive to said lifting of said plow part for simultaneously carrying out said shifting of said plow part in said horizontal direction.

10. Plow according to claim 9 in which said carrying means include a ground engaging rear wheel carriage at the rearward end of said rotatable plow part and having a wheel support member supported by a ground engaging wheel and in turn supporting and being reorientable to adjust the height of said rear bearing means and comprising a portion of said lifting means, said locating means at the rear of said rotatable plow part being rotatable on said rear bearing means, said mechanical linkage means including a transverse horizontal shaft on said locating means, crank arms engaging opposite ends of said transverse horizontal shaft, linkage members connecting the free ends of said crank arms respectively to said wheel support means and to a horizontally shiftable portion of said locating means, for shifting said rotatable plow part in said horizontal direction toward said axis for rotation in response to lifting of the rear end of said rotatable plow part.

11. Plow according to claim 10 including a universal joint interconnecting the one of said crank arms associated with said wheel support and the corresponding said linkage member, said universal joint having one axis aligned with the rear bearing means axis with said plow part in lifted position, to permit sufficient rotation of said rotatable plow part as to exchange one of said plow members for the other.

12. Semi-mounted or trailing roll-over plow, comprising:
a rotatable plow part;
means carrying said rotatable plow part and having front and rear bearing means for supporting said rotatable plow part for rotation about an axis of rotation;
said rotatable plow part including first and second plow members alternately selectable for use by rotation of said rotatable plow part to a corresponding operating position, said rotatable plow part having a center of gravity offset from said axis of rotation in said operating position;
means adjacent at least one of said front and rear bearing means and movably locating said rotatable plow part with respect to said one bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members, said locating means including a base frame rotatable on the axis of the adjacent bearing means, the adjacent end of the rotatable plow part being pivotable about a vertical axis on said base frame for said shifting of said plow part in said horizontal direction toward said axis of rotation;
a shift pressure fluid cylinder interconnected between said rotatable plow part and said base frame and extensible and contractable for relatively pivoting said base frame and rotatable plow part to accomplish said shifting of the latter in said horizontal direction.

13. Plow according to claim 12 including pivot means securing the opposite ends of said shift cylinder to said rotatable plow part and base frame and in which said pivot means and said vertically arranged axis lie near the central plane of that portion of the carrying means connectible to a tractor, and thereby lie near the central plane of such tractor.

14. Semi-mounted or trailing roll-over plow, comprising:
a rotatable plow part;
means carrying said rotatable plow part and having front and rear bearing means for supporting said rotatable plow part for rotation about an axis of rotation;
said rotatable plow part including first and second plow members alternately selectable for use by rotation of said rotatable plow part to a corresponding operating position, said rotatable plow part having a center of gravity offset from said axis of rotation in said operating position;
means adjacent at least one of said front and rear bearing means and movably locating said rotatable plow part with respect to said one bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members, said locating means including a base frame rotatable on the axis of the adjacent bearing means, the adjacent end of the rotatable plow part being pivotable about a vertical axis on said base frame for said shifting of said plow part in said horizontal direction toward said axis of rotation, said base frame being a rigid member fixed for rotation about the axis of the adjacent said bearing means, said locating means further including two transversely spaced linkage members each pivoted at one end thereof to said base frame and correspondingly pivoted at the opposite ends thereof to the adjacent end of said rotatable plow part.

15. Plow according to claim 14 including an arm fixed on one said linkage member adjacent one said linkage member pivot, and including a shift pressure fluid cylinder interconnecting said arm and said rotatable plow part for carrying out said shifting of the latter in said horizontal direction.

16. Plow according to claim 14 in which said linkage members of said pair lie at an angle to each other.

17. Plow according to claim 16 in which extensions of the longitudinal axes of said linkage members intersect at a point lying behind such linkage members, referred to the normal direction of travel of said plow.

18. Semi-mounted or trailing roll-over plow, comprising:
a rotatable plow part;
means carrying said rotatable plow part and having front and rear bearing means for supporting said rotatable plow part for rotation about an axis of rotation;

said rotatable plow part including first and second plow members alternately selectable for use by rotation of said rotatable plow part to a corresponding operating position, said rotatable plow part having a center of gravity offset from said axis of rotation in said operating position;

means adjacent at least one of said front and rear bearing means and movably locating said rotatable plow part with respect to said one bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members, said locating means including a base frame rotatable on the axis of the adjacent bearing means, the adjacent end of the rotatable plow part being pivotable about a vertical axis on said base frame for said shifting of said plow part in said horizontal direction toward said axis of rotation, a linkage member pivotally interconnecting said base frame and rotatable plow part, one end of said linkage member being on said vertical axis, and including adjustable stop means coacting between said linkage member and rotatable plow part for adjusting the cutting width of the forwardmost plow member on said rotatable plow part, said stop means being capable of limiting the horizontal shift of said rotatable plow part toward a previously cut furrow during plowing.

19. Semi-mounted or trailing roll-over plow, comprising:

a rotatable plow part;

means carrying said rotatable plow part and having front and rear bearing means for supporting said rotatable plow part for rotation about an axis of rotation;

said rotatable plow part including first and second plow members alternately selectable for use by rotation of said rotatable plow part to a corresponding operating position, said rotatable plow part having a center of gravity offset from said axis of rotation in said operating position;

means movably locating said rotatable plow part with respect to at least one of said front and rear bearing means for shifting of the center of gravity of said rotatable plow part in a substantially horizontal direction toward said axis of rotation, whereby to reduce the energy input to and output from the rotatable plow part during portions of its rotation between the operating positions of its sets of plow members, said first and second plow members being opposed, said rotatable plow part including an elongate frame member having ends secured to said carrying means through said locating means and laterally offset to one side of both plow member sets when either set is in operating position, said carrying means including front carrying means incorporating a universal joint having a vertical pivot axis for securement to a tractor hitch, a transverse horizontal axis and a member fixedly supporting said front bearing means and pivoted on said transverse horizontal axis, said locating means including a front base frame rotatable on said front bearing means about a substantially horizontal and normally substantially forwardly aligned axis and means pivotally connecting said rotatable plow part in generally trailing relation to said base frame, and further including an extensible power member pivotally interconnected between said base frame and rotatable plow part for carrying out said shifting in said horizontal direction toward said axis of rotation of at least the forward end of said rotatable plow part, from an operating position to a swung position and in preparation for a rotation of said rotatable plow part, said rotatable plow part in operating position normally angling rearwardly from said base frame, said locating means including a rear portion pivoted on said rear bearing means and extending forwardly therefrom to the rear portion of said rotatable plow part and pivotally interconnecting therewith on a vertical pivot axis, said carrying means extending rearwardly from said rear bearing means and including a ground engaging wheel and a lift cylinder actuable for lifting said rear bearing means from an operating position to a lifted position thereabove, and including shifting means engageable with said rear locating means for carrying out said shifting in the horizontal direction toward said axis of rotation as to the rear portion of said rotatable plow part, said shifting means being actuable substantially simultaneously with actuation of said lift means to coordinate lifting and shifting of said rotatable plow part and to thereafter enable a rotation of said rotatable plow part about the axes of said front and rear bearing means.

* * * * *